United States Patent Office 3,557,643
Patented Jan. 26, 1971

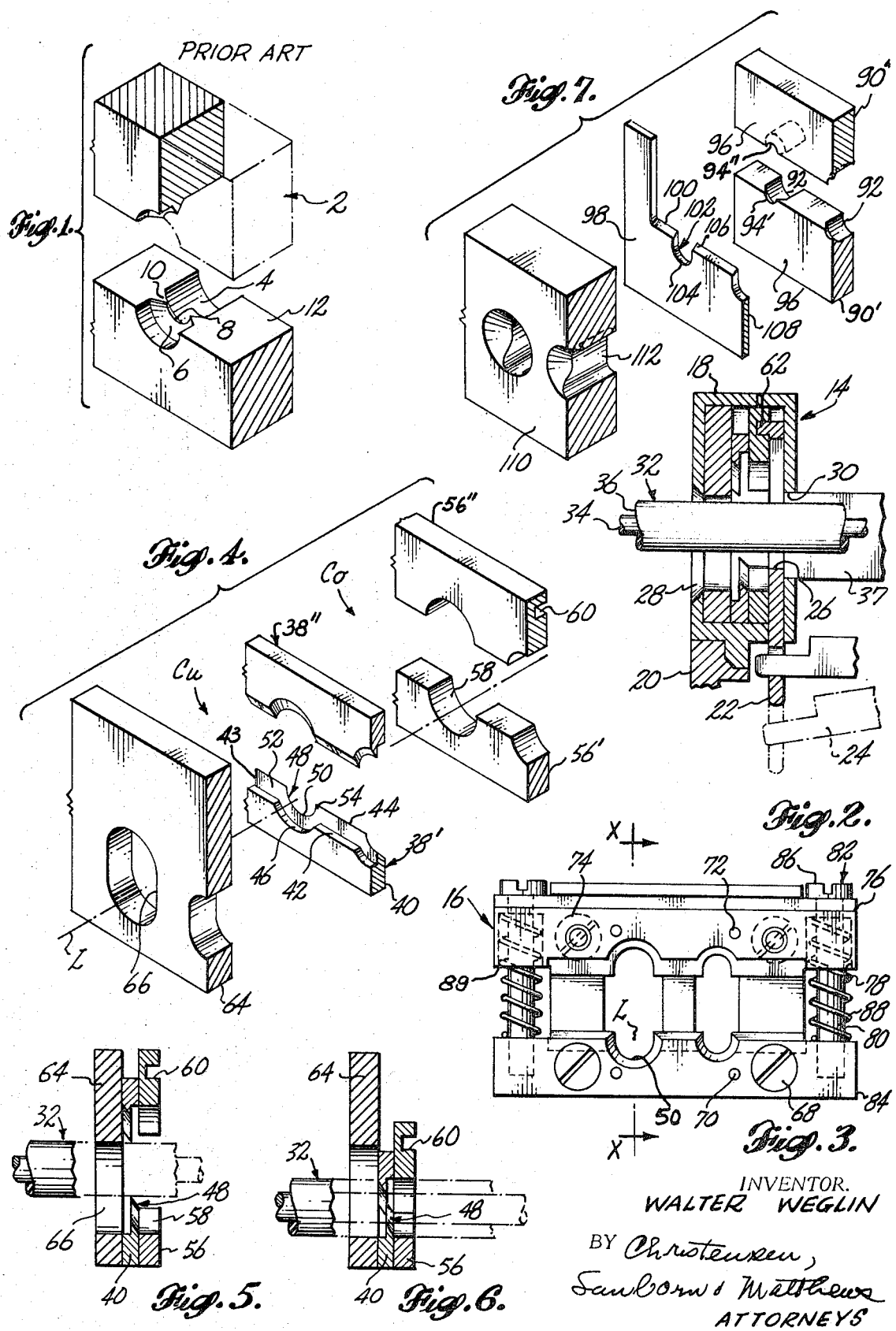

3,557,643
BLADE ASSEMBLY AND/OR STRIPPER FRAME FOR WIRE STRIPPING DEVICES
Walter Weglin, Seattle, Wash., assignor to The Boeing Company, Seattle, Wash., a corporation of Delaware
Filed Aug. 10, 1967, Ser. No. 659,808
Int. Cl. H02q 1/12
U.S. Cl. 81—9.5                                                6 Claims

ABSTRACT OF THE DISCLOSURE

A blade assembly and/or stripper frame for wire stripping devices which comprises a pair of relatively reciprocable cutter members which are cooperatively arranged to open and close about a line extending therebetween. The cutter members have planar faces thereon which are disposed in spaced parallel planes to slidably overlap one another when the members are closed about the aforesaid line, and which terminate at rectilinear edges thereon that pass one another as the members reciprocate. There are notches in the aforesaid edges which register with one another in the closed position of the members, to accommodate the core of the wire. There are also part annular cutting edges adjacent the bights of the notches which cut through the jacket of the wire as the members reciprocate towards the closed position thereof. The notch in the edge of at least one of the members has a width at the edge corresponding to the diameter of the conductive metal core of the wire, and a depth from the edge which is greater than the width of the notch. In addition, the edge portions of the aforesaid one member adjacent the sides of the notch, are sharply beveled at an acute angle to the face thereof, to form cutting edges which cut through those portions of the jacket on the sides of the conductive core corresponding thereto.

FIELD OF THE INVENTION

This invention relates to blade assemblies for making an annular cut in a wire, and more particularly to stripper frames for use in devices for cutting and stripping a length of the insulative jacket from an electrical wire.

BACKGROUND OF THE INVENTION INCLUDING CERTAIN OBJECTS THEREOF

In installing electrical wiring, the necessity frequently arises for making a termination. In such a case, a length of the insulative jacket is cut and stripped from the end of the wire to bare the conductive metal core below. In the past, this was accomplished either by hand or by means of a mechanically or thermally activated wire stripping device. The devices most frequently used were of the mechanically activated type, and in general they employed either of two types of mechanical stripper frames. One comprised a pair of colleting dies equipped with semicircular colleting blades which cut into the jacket as the wire was colleted between the dies. The other comprised a pair of semicircular knife blades which simply cut into the jacket without attempting to collet the wire. Each type was generally acceptable to the art, but suffered from one or more drawbacks which limited its effectiveness on the whole. For example, the die-type frame had the drawback that it failed to make a complete annular cut about the wire. As the die blades cut into the jacket, the angular end edges of the same could only compress those portions of the jacket which lay between them. As a result, the jacket was not entirely severed until those portions were torn apart by the tensile forces subsequently applied to the wire in the stripping phase of the operation. Not only was this damaging to the insulation, but also it was often necessary to trim up the shredded ends of the jacket by hand after the stripping operation to restore the wire to usable condition. The knife-type frame, on the other hand, made a complete cut about the jacket, but tended to scrape the surfaces of the conductive metal core during the stripping phase, and/or to dull quickly in use, due to the fact that the wire was not colleted in the frame as the blades were closed and drawn over the length of the same in the cutting and stripping operation.

With this in mind, one object of the present invention is to devise a blade assembly and/or stripper frame which is free from these drawbacks. Another object is to devise a blade assembly and/or stripper frame of this nature which makes a complete 360° cut through the insulative jacket of the wire, and also collets the wire in preparation for the stripping operation. A still further object is to devise a blade assembly and/or stripper frame of this nature which effectively centers the wire on the axis of the cut, before or during the time the cut is being made, and thereafter maintains the centered position of the wire while the separated portion of the jacket is being removed. Other objects include the provision of a blade assembly and/or stripper frame of this nature which can cut, and if desired strip the separated portion of the jacket without nicking and scraping the conductive core and without pinching, tearing or otherwise damaging the insulative jacket.

Still other objects relate to the incorporation of the blade assembly and stripper frame in the cutting and stripping mechanism of the wire stripping device. In the prior art the blade assembly and stripper frame were often so closely incorporated into the cutting and stripping mechanism that the entire mechanism and in fact more often the entire device had to be taken out of action and forwarded to a repair shop when it became necessary to sharpen or replace one or more of the blades. The resulting tool down-time for the unit often produced a loss in man hours as well as an economic loss, due to the necessity for replacing the unit with another unit while the first was in the repair shop.

A still further object of the invention, therefore, is to devise a blade assembly which is readily removable from the cutting and stripping mechanism, and from the device itself, and which can be thereafter readily disassembled for sharpening or replacement of one or more of the blades in the assembly. Other objects include the provision of such a blade assembly which has identical, and therefore interchangeable cutting members which are separable from the means for centering the wire, and which can be stocked as a single individual item for replacement of either or both cutting members should they become dull or damaged.

SUMMARY OF THE INVENTION

These objects and advantages are realized by a blade assembly and/or stripper frame of my invention which comprises a pair of relatively reciprocable cutter members which are cooperatively arranged to open and close about a line extending therebetween. The cutter members have planar faces thereon which are disposed in spaced parallel planes to slidably overlap one another when the members are closed about the aforesaid line, and which terminate at rectilinear edges thereon that pass one another as the members reciprocate. There are notches in the aforesaid edges which register with one another in the closed position of the members, to accommodate the conductive core of the wire. There are also part annular cutting edges adjacent the bights of the notches which cut through the jacket of the wire as the members reciprocate towards the closed position thereof. The notch in the edge of at least one of the members has a width at the edge corresponding to the diameter of the conductive metal core of the wire, and a depth from the edge which is greater than the width of the notch. In addition, the edge portions of the aforesaid one member adjacent the sides of the notch, are sharply beveled at an acute angle to the face thereof to form cutting edges which cut through those portions of the jacket on the sides of the conductive core corresponding thereto.

In one of the preferred embodiments of the invention, the one cutter member comprises a planar faced cutter die having a rectilinear edge on the face thereof, which has a part annular notch therein which in turn has a cutting edge about the perimeter thereof, coincident with the face of the die. It also comprises a knife blade having a rectilinear cutting edge thereon, juxtaposed against the aforesaid face of the die such that the cutting edge of the blade is relatively offset from the rectilinear edge of the die, on the opposite side of the line from the notch. A notch in the cutting edge of the blade registers with the notch in the die, to accommodate the conductive core of the wire. Preferably, the cutter die has a transverse face thereon which co-terminates with the aforesaid planar face of the die at the rectilinear edge thereof. The notch in the die is formed by a half-cylindrical groove in the transverse face of the die, having a knife blade with a semi-circular cutting edge thereon, formed at one end thereof, coincident with the planar face of the die.

In another of these embodiments, the one cutter member comprises a planar faced cutter blade having a rectilinear cutting edge on the face thereof, which has a U-shaped notch therein. The bight of the notch has its center within the notch, at point spaced below the aforesaid rectilinear cutting edge of the blade, and also a semicircular cutting edge thereon in the plane of the face. The other cutter member also comprises a similar cutter blade which is inverted and oppositely disposed with respect to the first-mentioned cutter blade.

For purposes of colleting the wire, the blade assembly and/or stripper frame also comprises a pair of superposed colleting dies having oppositely disposed part cylindrical grooves therein which open and close about the aforesaid line to center the wire on the line for the stripping operation. Preferably, the grooves are half-cylindrical in shape, and the colleting dies are conjointly relatively reciprocable with the cutter members. In fact, in the second-mentioned embodiment above, another similar cutter die may be employed together with the recited cutter die, to form the colleting dies.

Preferred embodiments of the invention also employ a slotted sizing plate which is juxtaposed in the assembly and/or frame with the cutter members, and equipped with a series of slots having the desired diameters.

BRIEF DESCRIPTION OF THE DRAWING

These features will be better understood by reference to the accompanying drawing which illustrates two of the aforedescribed embodiments as they are used in a cartridge-type stripper frame which forms part of the cutting and stripping mechanism embodied in the wire-stripping device described in my copending application Ser. No. 659,807, which was filed on even date herewith and titled "Wire Stripping Device," and which is now U.S. Pat. 3,383,959.

In the drawing:

FIG. 1 is an exploded part perspective view of a typical prior art die-type stripper frame;

FIG. 2 is a cross-sectional view of a stripper frame of the type employed in my aforesaid patent;

FIG. 3 is a rear elevational view of the cartridge employed in the stripper frame of FIG. 2;

FIG. 4 is an exploded part perspective view of the cutting, colleting and sizing components which are employed in the cartridge of FIG. 3 in accord with one embodiment of the invention;

FIG. 5 is a cross-sectional view of these components taken along the line X—X of FIG. 3 when the cutting and colleting components are in open position;

FIG. 6 is another cross-sectional view along the same line when the foregoing components are closed; and FIG. 7 is an exploded part perspective view of another set of cutting, colleting and sizing components which can be employed in the cartridge of FIG. 3 in accord with the other embodiment of the invention.

DESCRIPTION OF THE PREFERRED EMBODIMENTS

The die-type blade assembly shown in FIG. 1 is typical of those used in wire stripping devices heretofore. It comprises a pair of colleting dies 2 having mutually opposing half cylindrical grooves 4 therein. The grooves contain a pair of mutually opposed colleting blades 6 which have tapering walls thereon that define semicircular cutting edges 8 at their rims. The angular ends of the blades can be seen at 10. When installed and operated in a wire stripping device, the dies are relatively reciprocated to close about an axial line therebetween, and the grooves and blades are centered on the line when the opposing faces 12 of the dies meet. If an electrical wire is inserted between the dies, as for example the wire 32 seen in FIG. 2, the insulative jacket 36 of the wire is cut by the blades 6 where the edges 8 of the blades make contact with it, assuming that the grooves 4 and blades 6 are suited to the dimensions of the wire. However as can be judged from the configuration of the blades, not all portions of the jacket will be in the path of the cutting edges 8. To the contrary those portions opposite the gap between the dies, are compressed between the angular ends 10 of the blades and are not subjected to an effective cutting edge. Consequently a slug of the insulation cannot be entirely removed from the wire without some further step on the part of the device to sever these uncut portions. In most instances, this step is in the nature of applying tension to the jacket in the lengthwise direction of the wire, to tear the insulation on one side of the cut from the other. Of course, this is neither desirable nor commendable to the operation of the tool since the act of tearing the insulation tends to shred the fibers on both sides of the cut, and a subsequent step is often needed to trim off the shredded ends.

FIGS. 2–7 illustrate the manner in which I have solved this problem. In FIGS. 2–6, the illustrated frame 14 comprises an assembly of colleting and cutting components Co and Cu, respectively, which are detachably secured to one another to form a cartridge 16 which is slidably and removably inserted in a tubular sheath 18. The sheath is mounted on a reciprocable carriage 20 which forms part of a cutting and stripping mechanism, embodided in the wire stripping device described in my aforesaid patent application Ser. No. 659,807, filed on even date herewith. The sheath also has a slotted T-shaped actuating bar 22 slidably received therein, for purposes of actuating the collecting and cutting components as shall be explained hereinafter. The bar is received upright in the sheath between the cartridge and the right-hand or rear wall of the sheath, and is driven by a pivotally mounted crank member 24. A slot 26 in the bar, and slots 28 and 30 in the front and rear walls of the sheath, allow for passage of the electrical wire 32 through the frame. The wire is typical in that it has a conductive metal core 34 surrounded by a jacket 36 of rubber, plastice, cloth, or other insulative material. After it is passed through the frame, the wire is received in a flat-bottomed cradle 37 which has a scale thereon (not shown) to enable the operator to determine the desired strip length.

The cutting components Cu comprise a pair of superposed relatively reciprocable cutter members 38 which are fashioned from thick elongated bar platens 40 whose opposing faces are rabbeted along alternate edges thereof. The rabbets 42 produce raised ribs 43 along the lengths of the platens whose inside planar faces 52 are relatively offset but closely parallel to one another. The oppositely disposed edge portions of the ribs are suitably sharpened to form rectilinear knife-like cutting edges 44 in the planes of the surfaces. Also, the shoulders of the rabbets 42 are relieved at spaced oppositely disposed locations therealong, to form pairs of oppositely disposed part cylindrical grooves 46 therein, abreast of the ribs. At these same locations, U-shaped notches 48 are removed from the ribs and the perimeters of the notches are also given knife-like cutting edges. The semicircular bights 50 of the notches are concentric with the grooves 46, at centers positioned below the rectilinear cutting edges 44 of the ribs, but at a level above the adjacent shoulders of the rabbets 42, such that the planar surfaces 52 of the ribs may be overlapped in shear when the cutter members are relatively reciprocated to the point of placing the bights 50 on a common axial line L. Thus, the corners 54 of the notches at the cutting edges 44 of the ribs may serve as kniife-edged extensions for the semicircular blades in the bights 50 of the nothes; and together the blades and extensions may assure that a full 360° cut is made in the wire when it is centered on the line L.

The task of centering the wire on the line, and thereafter maintaining its centered condition throughout the stripping operation, is performed by the colleting components Co. These comprise a pair of superposed relatively reciprocable colleting dies 56 having oppositely disposed half cylindrical colleting grooves 58 therein. The colleting grooves have a radius equal to that of the part cylindrical grooves 46 in the cutter members 38, and when the two sets of components are assembled in the cartridge, the colleting grooves 58 and the cutter member grooves 46 are mutually aligned with one another on the centers of the bights 50 of the notches. The various grooves and notches are also sized in accord with the wire to be cut, and in order to assure that the wire does not exceed the radius of the grooves, a slotted sizing plate 64 is included in the cartridge, forward of the cutting and colleting components. The sizing plate has a series of oblong slots 66 therein, opposite the grooves 46 in the cutter members, and the upper and lower end portions of the slots have half cylindrical cross sections corresponding to the cross sections of the grooves. Thus, only a wire of the respective cross section, or less, can be inserted through the cartridge at each locatoin, and the risk of damage to a wire of some larger size is avoided. Also, the slots 66 are graduated from one side to the other, to take wires of different diameters, so that the operator can make his selection by choosing the first slot which accommodates the diameter of his wire.

An assembled cartridge is illustrated in FIGS. 3, 5, and 6. As seen, the sizing plate 64 and the sets of cutting and colleting components are arranged in parallel series alignment, and the lower cutter and colleting members 38' and 56' are secured to the lower half of the sizing plate by means of a pair of machine screws 68. Cooperating pin and hole connections 70 in the respective members enable the grooves 46 and 58 in the members to be accurately aligned with one another and with the bottom end portions of the slots 66. The remaining upper members 38" and 56" are similarly aligned by pin and hole connections 72, and are secured to one another by a second set of machine screws 74. In operation, the sizing plate and the lower members 38' and 56' remain stationary while the pair of upper members are reciprocated in relation thereto.

To allow for reciprocation, the opposing end portions 76 and 84 of the colleting dies are extended beyond the length of the cutting members; and a pair of countersunk bores 78 are formed in the ends of the upper colleting die to receive the shanks 80 of a pair of shoulder screws 82 which are threadedly engaged in upright positions on the ends of the lower colleting die. In the normal condition of the cartridge, the upper die 56" is abutted against the heads 86 of the screws by a pair of coiled springs 88 which are applied about the shanks of the screws between the upper face of the lower die and the closed ends of the counterbores 78. This condition places the upper cutting and colleting members 38" and 56" in a position above the upper end portions of the slots 66 and exposes the entire cartridge to insertion of a wire through the slot 66 corresponding to its diameter.

The cartridge is closed about the wire by depressing the actuating bar 22 which has a transverse flange 62 that engages in a slot 60 recessed across the back of the upper colleting die 56". As seen in FIG. 5, the wire typically occupies the upper end portion of the slot 66, and as the members 38" and 56" are depressed, they simultaneously drive the wire into the lower end portion of the slot as illustrated in FIG. 6. The cutting members thereupon make an annular incision in the jacket, while the colleting dies seize the wire and station it in the lower end portion of the slot. No part of the jacket is left uncut in the path of the cutting members, because of the overlapping action of the corners 54 of the notches 48. Bosses 89 on the end portions 76 of the die 56" operate to center the grooves 46 and 58, and the bights 50, on the line L, when they abut the end portions 84 of the lower die 56'.

So long as the actuating bar 22 remains depressed, the cutting and colleting members will remain in the closed condition about the wire. Similarly, so long as this condition continues, the cutting edges of the notches will remain within the cut so as to separate the "slug" to be stripped, from the main body of the jacket. Therefore, the step of reciprocating the carriage has the effect of forcing the slug off of the wire in the direction of motion. This effect is fully illustrated in my copending application.

The general rectangular transverse cross section of the cartridge is maintained, by relieving the upper faces of the end portions 76 of the die 56", to accommodate the heads 86 of the screws within the section, as seen in the rear elevational view of FIG. 3.

In the modified version of FIG. 7, the cartridge is assembled from a pair of cutting and collecting dies 90 which have mutually opposing half-cylindrical grooves 92 therein, the ends of which on corresponding faces 96 of the dies, have knife blades 94 formed therein with semicircular cutting edges about the perimeters thereof. A rectilinear knife blade 108 is juxtaposed against the face of the lower die 90' so that the knife edge 100 thereof overlaps the face 96 of the upper die 90". The edge 100 has U-shaped notches 102 therein, opposite the blades 94" in the upper die, and the bights 104 of the notches are concentric with the grooves 92, but of only sufficient radius to accommodate the core 34 of the wire 32. Thus, the corners 106 of the notches perform as knife-edged extensions for the blades 94' in the lower die 90'.

The assembly also includes a slotted sizing plate 110 which is juxtaposed against the face 98 of the blade 108, and has slots 112 therein for sizing the wire as in the embodiment of FIGS. 2–6.

Other modifications and additions can also be made in and to the invention without departing from the scope and spirit of the same as defined in the following claims.

I claim:

1. In a blade assembly for cutting an electrical wire, colleting and cutter die means including a die (90) having a half-cylindrical groove in one face thereof, and a knife blade having a semicircular cutting edge formed in the groove, at one end thereof, coincident with the adjacent face of the die transverse to the one face thereof, and another knife blade (98) having a rectilinear cutting edge thereon, juxtaposed against the aforesaid transverse face of the die such that the cutting edge thereof extends outwardly beyond the one face of the die, there being a notch in the latter cutting edge, opposite the groove, to accommodate the conductive core of the wire.

2. In a stripper frame for wire-stripping devices, a pair of relatively reciprocable cutter members which are cooperatively arranged to open and close about a line extending therebetween, said cutter mmbers having planar faces (108 and 96, or 52 and 52) thereon which are disposed in spaced parallel planes to slidably overlap one another when the members are closed about the aforesaid line, and which terminate at rectilinear edges thereon that pass one another as the members reciprocate, there being notches in the aforesaid edges which register with one another in the closed position of the members, to accommodate the conductive core of the wire, and part annular cutting edges adjacent the bights of the notches which cut through the jacket of the wire as the members reciprocate toward the closed position thereof, the notch (102 or 48) in the edge of at least one of the members having a width at the edge corresponding to the diameter of the conductive metal core of the wire, and a depth from the edge which is greater than the width of the notch, and the edge portions of the aforesaid one member adjacent the sides of the notch, being sharply beveled at an acute angle to the face thereof, to form cutting edges which cut through those portions of the jacket on the sides of the conductive core corresponding thereto.

3. The stripper frame according to claim 2 wherein the one cutter member comprises a planar-faced (96) cutter die (90) having a rectilinear edge on the face thereof, which has a part annular notch (94) therein, which has a cutting edge about the perimeter thereof, coincident with the face (96) of the die, and a knife blade (98) having a rectilinear cutting edge (100) thereon, juxtaposed against the aforesaid face (96) of the die such that the cutting edge (100) of the blade is relatively offset from the rectilinear edge of the die, on the opposite side of the line from the notch (94), there being a notch (102) in the cutting edge of the blade which registers with the notch in the die, to accommodate the conductive core of the wire.

4. The stripper frame according to claim 3 wherein the cutter die (90) has a transverse face thereon which coterminates with the aforesaid planar face of the die at the rectilinear edge thereof, and wherein the notch in the die is formed by a half-cylindrical groove (92) in the transverse face of the die, having a knife blade (94) with a semicircular cutting edge thereon, formed at one end thereof, coincident with the planar face (96) of the die.

5. The stripper frame according to claim 2 wherein the one cutter member comprises a planar-faced (52) cutter blade (38) having a rectilinear cutting edge (44) on the face thereof, which has a U-shaped notch (48) therein, the bight (50) of which has its center within the notch, at a point spaced below the aforesaid rectilinear cutting edge (44) of the blade, and a semicircular cutting edge thereon in the plane of the face (52).

6. The stripper frame according to claim 5 wherein the other cutter member also comprises a similar cutter blade (38) which is inverted and oppositely disposed with respect to the first-mentioned cutter blade.

References Cited

UNITED STATES PATENTS

| | | | |
|---|---|---|---|
| 3,151,509 | 10/1964 | Gormley | 81—9.5(-M) |
| 3,222,957 | 12/1965 | Kramer et al. | 81—9.51 |
| 3,344,691 | 10/1967 | Staggs | 81—9.5(a) |
| 3,403,441 | 10/1968 | Eubanks | 30—351X |

FOREIGN PATENTS

| | | | |
|---|---|---|---|
| 718,669 | 4/1942 | Germany | 81—9.51 |

T. E. CONDON, Primary Examiner

R. V. PARKER, Jr., Assistant Examiner